US011988767B2

(12) United States Patent
Nohara et al.

(10) Patent No.: US 11,988,767 B2
(45) Date of Patent: *May 21, 2024

(54) LOW COST, HIGH PERFORMANCE RADAR NETWORKS

(71) Applicant: Accipiter Radar Technologies Inc., Fonthill (CA)

(72) Inventors: Timothy J. Nohara, Fonthill (CA); Al-Nasir Premji, St. Catharines (CA); Andrew M. Ukrainec, Toronto (CA); Peter T. Weber, Dundas (CA); Graeme S. Jones, Waterloo (CA); Carl E. Krasnor, St. Catharines (CA)

(73) Assignee: Accipiter Radar Technologies Inc., Fonthill (CA)

( * ) Notice: Subject to any disclaimer, the term of this patent is extended or adjusted under 35 U.S.C. 154(b) by 959 days.

This patent is subject to a terminal disclaimer.

(21) Appl. No.: 16/050,880

(22) Filed: Jul. 31, 2018

(65) Prior Publication Data
US 2018/0335504 A1    Nov. 22, 2018

Related U.S. Application Data

(62) Division of application No. 13/775,660, filed on Feb. 25, 2013, now Pat. No. 10,101,437, which is a
(Continued)

(51) Int. Cl.
*G01S 7/04*    (2006.01)
*G01S 7/00*    (2006.01)
(Continued)

(52) U.S. Cl.
CPC .............. *G01S 7/046* (2013.01); *G01S 7/003* (2013.01); *G01S 7/068* (2013.01); *G01S 7/22* (2013.01);
(Continued)

(58) Field of Classification Search
CPC ...... G01S 7/046; G01S 13/937; G01S 13/917; G01S 7/068; G01S 7/292; G01S 7/003; G01S 7/22; G01S 13/726; G01S 13/87
See application file for complete search history.

(56) References Cited

U.S. PATENT DOCUMENTS 3,634,858 A    1/1972 Mitchell ....................... 342/190
3,634,887 A    1/1972 Buchholz et al. ............ 342/190
(Continued)

FOREIGN PATENT DOCUMENTS

JP    02291990       12/1990
JP    63-215983       9/1998
(Continued)

OTHER PUBLICATIONS

Colorado State University, "Chill Radar News". Twelfth Edition, Jan. 2004, 11 pages.
(Continued)

Primary Examiner — Matthew M Barker
(74) Attorney, Agent, or Firm — R. Neil Sudol; Henry D. Coleman

(57) ABSTRACT

A real-time radar surveillance system comprises at least one land-based non-coherent radar sensor apparatus adapted for detecting maneuvering targets and targets of small or low radar cross-section. The radar sensor apparatus includes a marine radar device, a digitizer connected to the marine radar device for receiving therefrom samples of radar video echo signals, and computed programmed to implement a software-configurable radar processor generating target data including detection data and track data, the computer being connectable to a computer network including a database. The processor is figured to transmit at least a portion of the target data over the network to the database, the database being accessible via the network by at least one user application that receives target data from the database, the
(Continued)

user application providing a user interface for at least one user of the system.

27 Claims, 6 Drawing Sheets

Related U.S. Application Data division of application No. 12/932,593, filed on Mar. 1, 2011, now Pat. No. 8,384,585, which is a division of application No. 11/110,436, filed on Apr. 20, 2005, now Pat. No. 7,940,206.

(51) Int. Cl.

| | | |
|---|---|---|
| *G01S 7/06* | (2006.01) | |
| *G01S 7/22* | (2006.01) | |
| *G01S 7/292* | (2006.01) | |
| *G01S 13/72* | (2006.01) | |
| *G01S 13/87* | (2006.01) | |
| *G01S 13/91* | (2006.01) | |
| *G01S 13/937* | (2020.01) | |

(52) U.S. Cl.
CPC .............. *G01S 7/292* (2013.01); *G01S 13/726* (2013.01); *G01S 13/87* (2013.01); *G01S 13/917* (2019.05); *G01S 13/937* (2020.01)

(56) References Cited

U.S. PATENT DOCUMENTS

| | | | |
|---|---|---|---|
| 3,725,912 A | 4/1973 | Buchholz et al. ............. 342/190 |
| 3,760,416 A | 9/1973 | Barriere et al. ............... 342/61 |
| 3,778,827 A | 12/1973 | Strenglein | |
| 3,840,874 A | 10/1974 | Dawson et al. ............. 342/190 |
| 4,047,170 A | 9/1977 | Miller ........................... 342/190 |
| 4,287,533 A | 9/1981 | Schwab et al. ............... 386/201 |
| 4,347,618 A | 8/1982 | Kavouras et al. | |
| 4,527,151 A | 7/1985 | Byrne | |
| 4,839,657 A | 6/1989 | Chikhani et al. ............. 342/190 |
| 5,254,999 A | 10/1993 | Lee | |
| 5,278,564 A | 1/1994 | Groenenboom | |
| 5,519,618 A | 5/1996 | Kastner et al. ............... 701/120 |
| 5,544,525 A | 8/1996 | Peterman et al. | |
| 5,663,720 A | 9/1997 | Weissman | |
| 5,848,378 A | 12/1998 | Shelton et al. | |
| 5,923,285 A | 7/1999 | Andrusiak et al. | |
| 5,971,580 A | 10/1999 | Hall et al. | |
| 6,211,814 B1 | 4/2001 | Benjamin et al. | |
| 6,249,241 B1 | 6/2001 | Jordan et al. | |
| 6,260,759 B1 | 7/2001 | Nguyen et al. ............... 235/411 |
| 6,342,852 B1 | 1/2002 | Liu et al. ....................... 342/176 |
| 6,707,414 B2 * | 3/2004 | Van Rees ................ G01S 13/34 |
| | | | 342/23 |
| 6,806,825 B2 | 10/2004 | Andrusiak et al. ........... 342/185 |
| 6,832,156 B2 | 12/2004 | Farmer | |
| 6,985,837 B2 | 1/2006 | Moon et al. | |
| 7,016,772 B2 | 3/2006 | Yanagi | |
| 7,301,497 B2 * | 11/2007 | Roddy ...................... G01S 7/20 |
| | | | 342/176 |
| 2001/0030624 A1 * | 10/2001 | Schwoegler ............ G01W 1/10 |
| | | | 342/357.52 |
| 2003/0025629 A1 | 2/2003 | Barrick et al. | |
| 2003/0028293 A1 | 2/2003 | Jankowiak et al. | |
| 2003/0028294 A1 * | 2/2003 | Yanagi .................. G01S 13/937 |
| | | | 701/21 |
| 2004/0032498 A1 | 2/2004 | Wyn-Harris et al. | |
| 2004/0039806 A1 | 2/2004 | Miras ........................... 709/223 |
| 2004/0104824 A1 | 6/2004 | Cole et al. .................... 340/971 |

FOREIGN PATENT DOCUMENTS

| | | |
|---|---|---|
| WO | WO 98/26306 A1 | 6/1998 |
| WO | WO 01/52218 A1 | 7/2001 |

OTHER PUBLICATIONS

Lumenera Corporation. "LE175 1.3 Megapixel Network Camera". Brochure. Revised Jan. 2004.
"Vessel Traffic Management & Information System VTMIS5060"; NOR Control IT AS; 2004; pp. 1 & 2.
"Norcontrol IT Wins Major Contract"; KNC News Archive; Jun. 13, 2001.
"Litton Marine Systems Introduces New-Generation Vessel Traffic System (VTS)" Sperry Marine News & pres Releases; Jul. 28, 2000; pp. 1-5.
"Litton Marine System Supplies VTS for River Locks in Holland"; Sperry Marine News & Press Releases; Aug. 18, 2000; pp. 1-5.
"Low-Cost Radar Surveillance of Inland Waterways for Homeland Security Applications" Peter Weber, et al.; Apr. 26-29, 2004; pp. 1-6.
"An Algorithm for Tracking Multiple Targets." By Donald Reid; IEEE Transactions on Automatic Control. vol. 24, Issue 6. Dec. 1979; pp. 843-854.
"Maritime Safety, Security, & Surveillance." Lockheed Martin Brochure; Jan. 2003; 8 Pgs.
"The Jindalee Operational Radar Network: Its Architecture and Surveillance Capability." By Alex Cameron; Record of the IEEE 1995 International Radar conference; May 8-11, 1995; pp. 692-697.
"Development of a Virtual Radar Environment." By Chandrasekar et al.; International GeoScience and Remote Sensing Symposium; vol. 6; Jul. 9-13, 2001; pp. 2599-2601.
"The Haida's Last Mission." By Bill Currie; The Standard [St. Catherines-Niagra] Aug. 27, 2003; pp. A1-A2.
"HMCS Hadia voyage to resting berth in Hamilton, Ontario will be tracked using newest homeland security radar technology developed by Sicom Systems Ltd. of Foothill, Ontario" By Carl Krasnor; Sicom Systems Ltd. Press Release; Aug. 23, 2005.
Weber, P. et al., "Low Cost radar surveillance of inland waterways for homeland security applications", Apr. 26, 2004, Radar Conference 2004. IEEE pp. 134-139 XP010711545.
Kulkarni et al. "Aviation Data Integration System". 11 pages. Jun. 25, 2013. Accessed online Sep. 25, 2015. <http://ntrs.nasa.gov/archive/nasa/casi.ntrs.nasa.gov/20030065976.pdf>.

\* cited by examiner

LOW COST, HIGH PERFORMANCE RADAR NETWORKS

CROSS-REFERENCE TO RELATED APPLICATIONS

This application is a continuation of application Ser. No. 13/775,660, now U.S. Pat. No. 10,101,437, which was filed Feb. 25, 2013 as a division of application Ser. No. 12/932,593, now U.S. Pat. No. 8,384,585, which was in turn filed Mar. 1, 2011 as a division of application Ser. No. 11/110,436 filed Apr. 20, 2005, now U.S. Pat. No. 7,740,206.

FIELD OF THE INVENTION

This invention relates to land-based radar surveillance of wide areas or local sites. It also relates to radar detection and tracking and multi-sensor fusion.

BACKGROUND OF THE INVENTION

"Homeland Security" refers to the goal of detecting and defending against threats to public safety posed by potential attack by hostile individuals or groups. Homeland Security applications for radar surveillance differ fundamentally from most military applications. The high price of military radars is justified by the critical and urgent need for protection in combat zones or near high-value assets. The price is affordable because the deployments are confined in time and/or space. Homeland Security, in contrast, deals with threats, such as terrorist attacks, that materialize infrequently and can occur anywhere. Surveillance to counter such threats must be deployed simultaneously across huge areas on a permanent 24/7 basis. Therefore, in the market for sensors used for Homeland Security surveillance, low-cost is not just a competitive advantage, it is a fundamental requirement.

Homeland Security includes such applications as border patrol, law enforcement, critical infrastructure protection (both corporate and public facilities), transportation security, port security and coastal surveillance. All of these applications require cost-effective detection and tracking of small, fast, maneuvering, elusive targets. Targets of interest include (but are not limited to) small watercraft in littoral regions, and snowmobiles on snow or ice cover, or other vehicles. At the present time, low-cost radar systems suitable for these homeland security applications are not operational.

Altogether different problems that also require cost-effective detection and tracking of small, fast, maneuvering, elusive targets are the bird air strike hazard (BASH) problem and the natural resource management (NRM) problem concerning birds. Billions of dollars in damage to aircraft and significant loss of life have been recorded due to birds flying into aircraft, particularly during take-off and landing in the vicinity of airports. At the present time, low-cost radar systems suitable for these avian radar applications are under development.

Practical solutions for the aforementioned applications must be able to provide continuous, day or night, all weather, wide-area situational awareness with automated detection, localization and warnings of threats. The wide-area situational awareness points towards a network of radars operating together to provide a composite picture. The automated warning of threats points toward high-quality target track data with sophisticated criteria to determine suspicious or potentially dangerous target behavior, as well as communication of alerts to users who require that information. Furthermore, practical solutions must also minimize operator interaction due to the fact that system cost includes the cost of human labor needed to operate the system.

Some of the key requirements of the cited applications include:

Low-cost, high-performance radar antennas and transceivers that can be mounted on land-based towers as well as on mobile vehicles and vessels.

Radar processing that can reliably detect and track small, low-RCS, maneuvering targets in dense target and clutter environments.

Automatic threat detection and alert capability to remote users

The formation of radar networks to provide wide-area coverage

Low cost of operation

Low life cycle costs

Data and analysis support for research and development

While X-band or S-band coherent radar technology used in air traffic control and military radars could be integrated, reconfigured and optimized to satisfy performance requirements for the aforementioned applications, such systems would not be affordable. Typically, each radar sensor would cost in the millions of dollars, not taking into account the life cycle costs of maintaining and operating such systems. The purpose of the invention disclosed herein is to provide a low-cost radar surveillance solution to these problems, where the radar sensor would cost as little as $50,000 or less.

Commercial, off-the-shelf (COTS) marine radars (from companies such as Furuno, Raymarine, Decca, etc.) are very inexpensive due to the fact that they are noncoherent and that millions of them are sold world-wide for use on commercial and recreational vessels. A radar antenna and transceiver can be purchased for under $10,000, depending on the transmitter power and antenna selected. These marine radars exhibit surprisingly good hardware specifications such as transmitter power, receiver characteristics and antenna pattern. However, in operation, these radars deliver mediocre performance for our targets of interest because of their primitive signal processing. They are primarily used for detecting large vessels and shorelines for navigation and collision avoidance purposes.

Combining a COTS marine radar with a digitizer board and a software radar processor that runs on a COTS personal computer (PC) can allow a marine radar to be adapted for other applications. One vendor [Rutter Technologies, www.ruttertech.com] has developed a radar processor for such a system [the Sigma S6 Processor] where the radar processor is tuned for detecting slow-moving floating ice targets (such as ice bergs or bergy bits) in the sea by using scan-to-scan integration techniques over time frames of 20 seconds to 160 seconds (to improve signal to clutter ratio (SCR)) combined with an alpha-beta tracker designed for non-maneuvering targets. This system has been designed for maritime operation on-board a vessel or moored platform and hence does not deal with the formation of radar networks, does not solve the small-RCS, fast, maneuvering target problem, and does not provide low-cost of operation since an operator is needed for each system. In addition, alerts are not automatically provided to remote users for unattended operation.

OBJECT OF INVENTION

The objects of the present invention concern radar surveillance networks applied to homeland security and avian radar applications.

A primary object of the present invention is to provide a land-based, radar system that is low-cost and high-performance for Homeland Security, BASH and NRM applications.

Another object of the present invention is to develop sophisticated radar signal and data processing algorithms that can reliably detect and track small, low-RCS, maneuvering targets, including small watercraft, snowmobiles, birds and aircraft, in dense target and clutter environments.

Another object of the present invention is to provide a low-cost, high performance radar sensor that can be networked with other like and dissimilar sensors to form low-cost, high-performance radar networks with situational awareness and wide-area coverage.

Another key object of the present invention is to use sophisticated radar processing combined with spatial diversity (associated with the location of radar sensors making up a radar network), which allows the performance of a low-cost, noncoherent radar system to approach that of much more expensive coherent radar systems.

Another object of the present invention is to take advantage of standardized COTS technologies to the maximum extent possible to keep the system cost low and to provide for low life cycle costs associated with maintainability, upgrade ability and training.

Another object of the present invention is that COTS marine radars are used as the radar sensor in order to minimize sensor costs.

Yet another object of the present invention is that the radar sensors and systems are software-configurable so as to allow them to be easily adapted for different applications.

An object of the present invention is that operator interaction is minimized in order to reduce the cost of operation.

Yet another object of the present invention is that the radar sensors and system can be controlled remotely.

Another key object of the present invention is that it supports remote users with different user requirements.

Yet another object of the invention is that it can provide automated threat detection and issue alerts to local and remote users.

Another object of the present invention is that radar target data are geo-referenced using a geographic information system (GIS) so that target data is tagged to earth co-ordinates and target dynamics including speed and heading are provided.

Yet another object of the present invention is that the radar system incorporates features that efficiently support research and development and off-line analysis, allowing for example, target behavior to be studied so that target classification algorithms can be developed, or allowing target data to be studied and replayed after the fact, to assist, for example, in the prosecution of terrorists.

These and other objects of the invention will be apparent from the drawings and descriptions included herein. It is to be noted that each object of the invention is achieved by at least one embodiment of the invention. However, it is not necessarily the case that every embodiment of the invention meets every object of the invention as discussed herein.

SUMMARY OF THE INVENTION

The present invention relates to the design of a low-cost, high-performance, land-based radar sensor and a radar network consisting of one or more of these radar sensors designed for homeland security and avian radar applications. These challenging applications and some of the features and performance of the present invention have been reported in [Weber, P et al., *Low-cost radar surveillance of inland waterways for homeland security applications*, 2004 IEEE Radar Conference, Apr. 26-29, 2004, Philadelphia, PA] and [Nohara, T J et al, *Affordable avian radar surveillance systems for natural resource management and BASH applications*, 2005 IEEE International Radar Conference, May 9-12, 2005, Arlington, VA], respectively, which are incorporated herein by reference.

A feature of the present invention is the preferred use of COTS marine radars to provide economical antennas and transceivers that operate at X-band and S-band. COTS marine radars exhibit surprisingly good hardware specifications such as transmitter power, receiver characteristics and antenna pattern. However, in operation (for homeland security and avian radar applications) these radars deliver mediocre performance because of their primitive signal processing. The first part of our invention is to create an inexpensive radar sensor with high performance by integrating a sophisticated radar processor with COTS marine radar equipment. The radar processor itself incorporates sophisticated algorithms and software that runs preferably on COTS personal computers (PC) to keep costs down. The system design of the invention described herein demonstrates that affordable COTS marine radars combined with COTS personal computers (PCs) with specialized software can provide powerful surveillance systems.

For the cited applications, which are the focus of this disclosure, targets of interest include small watercraft, snowmobiles, and birds. These small, fast moving and maneuvering, non-cooperative targets have low (and fluctuating) radar cross-sections (RCS), and compete with ground (e.g. land, snow, ice cover, urban features), water and weather clutter. COTS marine radars are designed for navigation and recreational use and, as such, have low small-target detection sensitivity. The presence of many friendly targets further complicates matters and the tracking circuits included with these radars are completely inadequate for our targets of interest. To detect these small targets with these marine radars, surveillance operators would need to observe the display over several consecutive radar scans in order to begin to assess the situation at hand. This is a difficult task that causes operator fatigue very quickly, is not reliable, and hence is not used in practice. To mitigate these problems, our invention digitizes the raw radar video signal from the marine radar receiver and uses a PC-based radar processor with sophisticated processing to achieve significantly improved performance. The radar processor of the subject invention incorporates a detection processor, a track processor, and a display processor. Prior art processors have used significant amounts of scan-to-scan integration to increase the SCR and thereby improve detection sensitivity for small, slow-moving targets such as ice bergs, bergy bits, and capsized vessels or persons-in-water. These prior art systems exploit the fact that the radars are mounted on vessels and that sea clutter decorrelates over a relatively short time. Scan-to-scan integration is not applicable to the fast-moving targets of interest of the present invention for two fundamental reasons: 1) the targets move out of the radar resolution cell due to fast movement, and 2) the land clutter that dominates detection due to the fact that the radar sensors are land-based does not decorrelate as quickly as sea clutter. As a result, a different approach must be adopted to improve detection sensitivity. Rather than emphasize the steady ground returns with scan-to-scan integration, they are preferably removed with an adaptive clutter map. This is an important part of pre-detection radar processing when detecting in and around ground clutter. Ground clutter usually originates through mainbeam illumination when the antenna beam is pointed horizontally or looking down from a tower. Even for cases where the antenna is pointed up, for example, to detect birds, clutter originates from the antenna elevation sidelobes. After most clutter has been suppressed, the detection processor of the present invention produces detections (also called plots) by setting lower detection thresholds than conventional processors, and thus is able to detect smaller targets. The consequence of using lower detection thresholds is that an undesired, higher false alarm rate results, particularly due to the strong clutter residual in the vicinity of the land-based radars used in the present invention. The track processor of the present invention depends on sophisticated association and track filtering algorithms that are designed to handle both the high false alarm rate and maneuvering targets. These approaches are unique to the present invention.

The plot-to-track association algorithm provides means to resolve ambiguities produced by multiple targets, missed detections, false alarms, and maneuvering targets, whereas the track filtering algorithm provides high quality estimates of target dynamics for the association algorithms and for the display processor. While the track filtering algorithm performs well with non-maneuvering targets, it uses special algorithms to handle maneuvering targets and this feature is unique to the present invention. The track processor preferably uses a sophisticated plot-to-track association algorithm called MHT [D. B. Reid, "An algorithm for tracking multiple targets", IEEE Transactions on Automatic Control, vol. AC-24, no. 6, December 1979, pp. 843-854] and preferably uses an advanced track filtering algorithm called Interacting Multiple Model (IMM) filtering [G. A. Watson and W. D. Blair, "IMM algorithm for tracking targets that maneuver through coordinates turns", Proceedings of the SPDE (Society of Photo-Optical Instrumentation Engineers, vol. 1698, Signal and Data Processing of Small Targets, Apr. 20-22, 1992, pp. 236-247]. It is understood that this invention includes schemes wherein the association algorithm is replaced by alternate techniques known to those skilled in the art and described in the literature including [S. S. Blackman, Multiple-Target Tracking with Radar Applications, Artech House, 1986], and wherein the track filtering algorithm is replaced by alternate techniques known to experts in the field and described in the literature including [S. S. Blackman, Multiple-Target Tracking with Radar Applications, Artech House, 1986]. Furthermore, this invention also includes schemes where the association and track filtering algorithms are combined into a single algorithm such as the Probabalistic Data Association algorithm and its numerous variants [Y. Bar-Shalom, "Tracking methods in a multi target environment: survey paper", IEEE Transactions on Automatic Control, vol. AC-23, no. 4, August 1978, pp. 618-626], [S. S. Blackman, Multiple-Target Tracking with Radar Applications, Artech House, 1986].

For homeland security and avian radar applications, one radar, or even several independently operating radars is often not enough to provide a high-performance, composite tactical picture for a wide area of interest. For any single radar, there are gaps in coverage due to obstructions; and the area covered may not be a wide enough area. Thus the second part of our invention is to network radars to a central monitoring station (CMS), and then integrate (and/or fuse) target data from all of them. A single system is suitable for monitoring a geographically close group of sites or even a fairly large waterway. Multiple systems can be further networked together to provide integrated coverage of extended routes or border regions. Mobile systems are appropriate for monitoring regions needing more intermittent coverage. The benefits of fusion algorithms to further improve track quality will become apparent in the sequel. The networking of a number of land-based radar sensors (each consisting preferably of a COTS marine radar combined with a sophisticated radar processor) and the fusion of their target data to provide improved tracking performance is a novel and unique feature of the present invention.

A major challenge of continuous, wide-area surveillance is the high cost of human effort to monitor sensor displays. The networking of radar sensor target data to a CMS reduces the human costs significantly, since monitoring can be done far more efficiently at a single CMS than at the individual radar sensor sites. However, further reductions in human operator costs are desirable, especially in applications such as border patrol, where vast regions of border have little or no target activity for extended periods of time. In such cases, another feature of the present invention is particularly valuable. The track data produced by system of the present invention contains detailed (but compact) long-term behavior information on individual targets. For any given scenario, these data can be automatically tested for suspicious activity, in order to generate alerts to security personnel. Because the information is detailed, alerts can reflect complex behavior, such as collision predictions, origins and destinations of vessels, perimeter approaches or violations, density of traffic, etc. The low-bandwidth track and alert information can be easily sent to central locations, and directly to end users, providing economical, effective monitoring. A novel feature of the present invention is the provision of automated alerts to remote users who require them. This enables the radar surveillance system to run unattended with users alerted only when necessary. Furthermore, track displays can be provided to remote users to give them a clear picture of the situation when alerts arise. The invention preferably exploits COTS communication technology to provide such remote alerts and displays inexpensively.

Further human cost reductions can be achieved with the present invention through the provision of hardware and software to remotely control the operation of each radar sensor, including the operation of each sensor's radar processor, as well as the operation of its marine radar transceiver. A novel feature of the present invention is the remote control of each radar sensor to reduce the human cost of operating and maintaining the radar network of radar sensors.

The applications towards which the present invention is directed require further research and development (R&D) in order to increase and establish knowledge concerning target behavior. This knowledge can be used, for example, for automatic target identification. Off-line analysis of target data can be used with ground truth data to better understand bird signatures, for example, which could then be used to develop bird identification algorithms. In BASH applications, knowing the kind of bird that is being tracked is valuable for forming an appropriate response (e.g. should aircraft delay take-offs and landings or make an evasive maneuver to increase safety). In homeland security applications, target identification could be very useful in determining whether a real threat exists when a target approaches a security perimeter near some critical infrastructure. Another example would be to perform off-line statistical analyses of target data in order to learn routes and patterns characterizing criminal activity in border areas. A novel feature of the present invention is the ability to continuously store complete target detection and track data over extended periods of time in order to support such R&D activities. Another novel feature of the present invention is the ability to rapidly play back stored target data into the radar processor in order to study and analyze the data. Prior art systems (particularly those employing COTS marine radars) do not provide such support for R&D activities.

DETAILED DESCRIPTION

Figure 1:
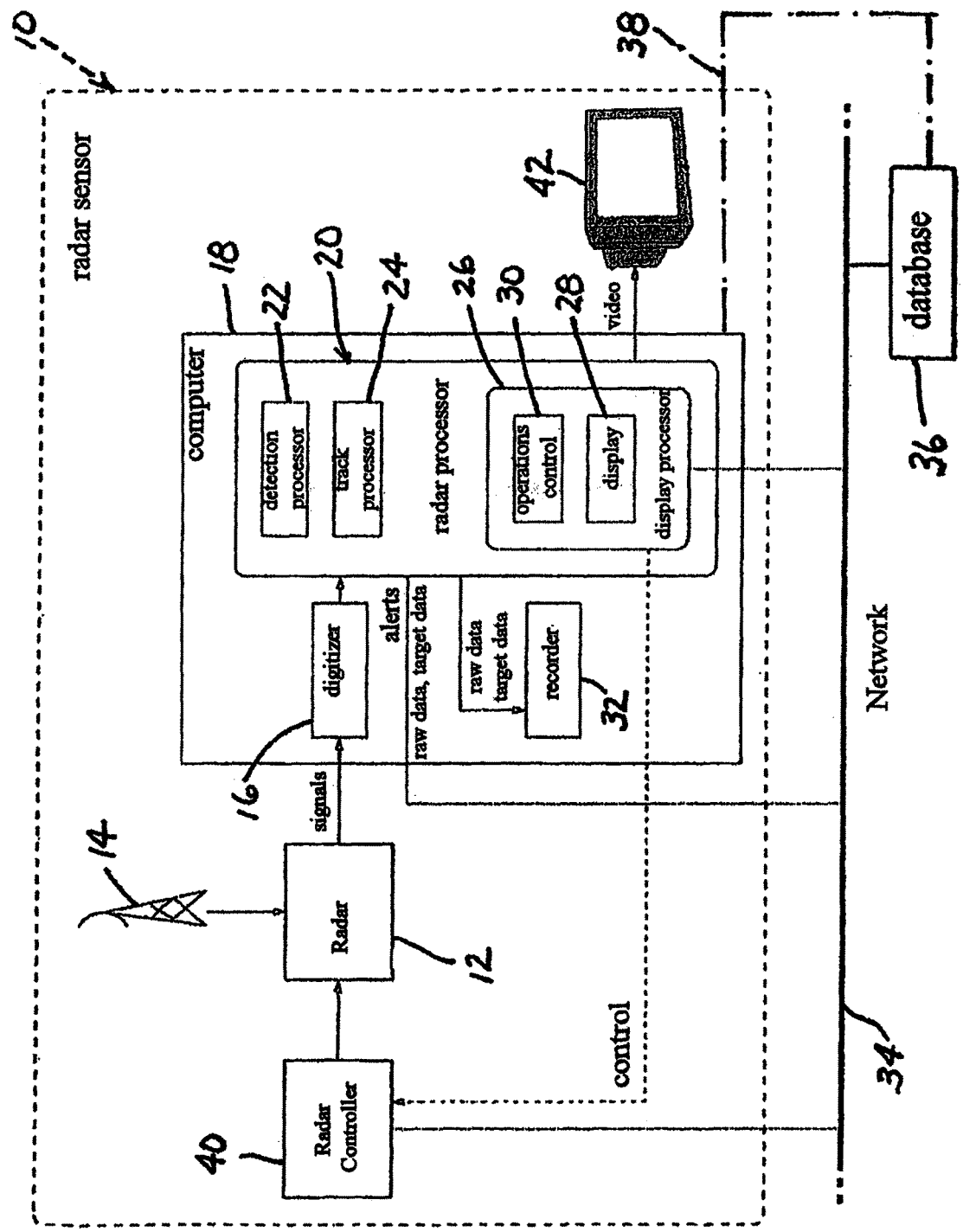
FIG. 1 is a block diagram of a radar sensor apparatus included in a radar surveillance system, in accordance with the present invention.

A block diagram of a radar sensor apparatus 10 in accordance with the present invention is shown in FIG. 1. Characteristics of each block are as follows. The radar sensor apparatus 10 includes a radar device 12 that is typically noncoherent and transmits pulses of constant width at a constant pulse repetition frequency (PRF) at X-band or S-Band. Radar device 12 typically has either a continuously rotating or sector scanning antenna 14. Antenna 14 is elevated to be several meters above the area to be monitored, and has a detection range of several kilometers. COTS marine radars typically have these characteristics and are preferred for the present invention due to their availability, low-cost, and good antenna and transceiver characteristics.

Radar device 12 takes the form of a marine radar. A typical marine radar is noncoherent, transmits at X-band with 50 kW peak power, pulse repetition frequency (PRF) between 1 and 2 kHz and with pulse width between 0.1 and 1 μs. It has a 2 m antenna with a narrow azimuth beamwidth and a wide elevation beamwidth, rotates at 24 RPM, and has up to 165 km range. A radar such as this retails for around $50,000. Marine radar configurations are based on choosing a peak power/maximum-range value and an antenna size. Radars with peak powers up to 10 kW typically retail for less than $10,000. The lower-power radars can be purchased for as little as two or three thousand dollars making them very cost effective.

Notwithstanding these typical characteristics, radars with other features known to those skilled in the art (e.g. multi-frequency operation) could be employed without departing from the spirit of the invention.

In some applications, it is important to use a specialized antenna 14 to meet requirements. An avian radar application, for example, often requires bird height information. A typical marine radar antenna with a 20° elevation beamwidth does not provide accurate enough height estimates in these cases. As a result, other antennas may be preferred. In the article [Nohara, T J et al, Affordable avian radar surveillance systems for natural resource management and BASH applications, 2005 IEEE International Radar Conference, May 9-12, 2005, Arlington, VA], a 4° pencil beam dish antenna is described that has been successfully tested in the field with an implementation of the radar sensor of the present invention. This antenna provides better height estimates of birds but its coverage is limited. To solve the coverage problem, antenna 14 may be an elevation-monopulse antenna to provide simultaneously good height estimates with full coverage in elevation. The present invention provides for the integration of such an antenna into the radar sensor apparatus 10. While a phased array antenna could be integrated into the radar sensor 10 of the present invention, it is not a preferred embodiment of the present invention due to the significantly higher cost anticipated for such an antenna. In addition, it is not clear that the volume search rate of such a two-dimensional antenna could satisfy target update requirements.

As illustrated in FIG. 1, a digitizer 16 is connected to an output of marine radar device 12 for collecting radar video samples from each pulse, at sampling rates and over range intervals appropriate for the operational mode. Digitizer 16 is preferably a PC card mounted on a bus of a computer 18, which is preferably a commercial off-the-shelf (COTS) PC. The PC computer 18 can run any standard operating system, but preferably runs a Microsoft Windows™ operating system. The digitizer 16 itself is preferably a COTS product to further reduce the radar sensor cost. The digitizer 16 preferably samples the radar video signal at 12-bits and operates in real-time. The digitized signals are the full-bandwidth, unprocessed radar signals captured in real-time to create a fully digital radar sensor in which the radar's signal processing and operating characteristics are determined by a radar processor 20.

Radar processor 20 is implemented as generic digital processing circuits of computer 18 modified by programming, or configured by software, to accomplish the functions described hereinafter. Radar processor 20 includes a detection processor or pit extractor 22, a multi-target track processor 24 and a display processor 26 all of which are preferably implemented in real-time by software that runs on the COTS PC 18. The software is preferably written in C/C++, and possibly assembly, and uses multi-threaded programming to provide a highly responsive application as well as for computational efficiency. The software also preferably exploits the Single Instruction Multiple Data (SIMD) capabilities of modern processors to considerably improve processing speed. The software could be developed in any language known to those skilled in the art without departing from the spirit of this invention.

Detection processor 22 declares the presence and location of targets preferably on each radar scan. Track processor 24 sorts the time-series of detections (also called plots) into either tracks (confirmed targets with estimated dynamics) or false alarms. The processed information produced by radar processor 20 can be presented to the operator on a local display 28 that is part of display processor 26. This information may include scan-converted video, target data including detection data and track data, maps, user data (e.g. text, push pins) etc. Operator controls 30 may be local as well and provide a graphical user interface for the local user to control the operation of the radar processor 20.

The radar processor 20 performs radar signal processing functions known to those skilled in the art such as scan-conversion, adaptive clutter-map processing to remove ground and weather clutter, sector blanking to suppress detections in regions that are not of interest, constant false alarm rate (GEAR) processing, and digital sensitivity time control (STC). These functions may be included in either the detection processor 22 or the display processor 26, but preferably are included in both so that the user display can be optimized for the user while the detection processor can be optimized for detection and tracking performance.

Conventional radars employing automatic detection and tracking algorithms typically set the detection threshold high enough to achieve a probability of false alarm (PEA) to 1 in $10^6$ resolution cells or less. For a radar display extending 50 km in range with a 100 m range resolution and 1° azimuth resolution, this translates to about 1 false alarm every 5 scans or 12 seconds (typical marine radar scan rates are 24 RPM). In contrast, low detection thresholds are a special feature of the detection processor 22 and are used in order to increase the sensitivity of the radar, allowing smaller targets to be detected. An unwanted side effect is that the false alarm rate increases substantially, making it more difficult for tracking to perform. For example, the PEA could drop 3 orders of magnitude from typical settings to say $10^{-3}$ resulting in 180 false alarms per scan or 72 false alarms per second. This is a huge stress on tracking. To mitigate this effect, as well as to successfully track through maneuvers without degradations in track quality, the track processor 24 preferably includes multiple hypothesis testing (MHT) tracking with interacting multiple model (IMM) extended Kalman filtering as described earlier, and which are further described in [D. B. Reid, "An algorithm for tracking multiple targets", IEEE Transactions on Automatic Control, vol. AC-24, no. 6, December 1979, pp. 843-854], [G. A. Watson and W. D. Blair, "IMM algorithm for tracking targets that maneuver through coordinates turns", Proceedings of the SPIE (Society of Photo-Optical Instrumentation Engineers, vol. 1698, Signal and Data Processing of Small Targets, Apr. 20-22, 1992, pp. 236-247], These advanced processing algorithms often found in military radars yields the performance of much higher-priced systems and have been shown to work well under these high false alarm rate conditions.

The display processor 26 provides a real-time display. Preferably, a map is integrated with the radar display and provides a background on which is overlaid geo-referenced radar data, including target data (tracks and detections), target echo trails, as well as scan-converted radar video in the form of a PPI display. These features enable target behavior to be more easily understood, where the display processor 26 can be viewed as a geographical information system (GIS). Cursor position in latitude and longitude, or UTM coordinates is continuously read Out in the status bar, and numerous display features common to marine radars such as electronic bearing lines and virtual range markers are available. Small symbols at the location where the threshold is exceeded indicate detections. A history of detections from previous scans can be shown, with fading intensities indicating scan time (the current scan's detections are the brightest). Tracks are indicated by a different symbol drawn at a target's current position with a line emanating from the symbol indicating the heading. The operator can select any track on the screen, and the system will display target information such as position, speed, heading, track stage, track uncertainty, echo size and intensity. These target attributes can also be used for the study and classification of targets of interest, and for multi-sensor fusion. Detection and track data are rich with target attributes that are available for viewing by the operator in real-time. At any instant in time, the track histories provide situational awareness of recent activity. Any suspicious behavior (e.g. perimeter crossings) can be recognized, and communicated to authorities.

Many of the aforementioned radar processor features as well as features not mentioned above are described in [Weber, P et al., Low-cost radar surveillance of inland waterways for homeland security applications, 2004 IEEE Radar Conference, Apr. 26-29, 2004, Philadelphia, PA] and [Nohara, T J et al, Affordable avian radar surveillance systems for natural resource management and BASH applications, 2005 IEEE International Radar Conference, May 9-12, 2005, Arlington, VA]. For example, the benefits of the low detection thresholds to improve small target detection sensitivity are demonstrated with real data in [Weber, P et al., Low-cost radar surveillance of inland waterways for homeland security applications, 2004 IEEE Radar Conference, Apr. 26-29, 2004, Philadelphia, PA] along with the ability of the track processor 24 to track reliably through target maneuvers without increasing track uncertainty. Clutter-map processing is demonstrated in [Nohara, T J et al, Affordable avian radar surveillance systems for natural resource management and BASH applications, 2005 IEEE International Radar Conference, May 9-12, 2005, Arlington, VA] to reject ground clutter so that birds can be detected along with a specialized target echo trails display mode that is a feature of the present invention.

A feature of the digital radar processor 20 of the present invention is the implementation of automated alerts based on target behavior inferred from track data. Target behaviors such as perimeter breach, collision prediction or any complex behavior can be defined. When operating as an automated monitoring system, security perimeters are preferably defined. The radar processor then determines when targets approach and cross these perimeters, and issues appropriate alert responses. Preferably, target detection, tracking and threat recognition algorithms are customized for specific threats and scenarios. Alerts can include an audible alarm and display indication to an operator, or a transmitted message to a remote user. Transmitted messages are preferably communicated over a network to remote users using networking and communication methods and technology known to those skilled in the art. Preferably, alerts can be issued as text messages or e-mails directed to pagers, cell phones, personal data assistants, Blackberrys™ etc. using COTS technology. Alerts can minimize required operator resources even to the point of permitting some systems to run 24/7 unattended.

A recorder 32 shown in FIG. 1 can store the received radar video samples onto disk or tape. Target data including track data and detection data can also be recorded. Target data is a more compact and convenient alternative to raw radar video and can easily be stored continuously, 24/7, without stressing the storage capacity of a COTS PC. These same data can be remoted over a network 34; full-fidelity raw video, however, generally requires very high-speed networks. Target data, on the other hand, can be handled on low-speed networks, including real-time distribution over COTS wireless networks and over the Internet through inexpensive COTS networking hardware. The stored data (in either raw format or target data format) can subsequently be played back through any computer running the radar processor software; it is not necessary that it be connected to a radar. This feature is useful for off-line analysis, investigations, evidence for use in prosecutions, etc. Target data can be archived for longer-term investigations. The recorder 32 stores target data in accordance with operator selections. The recorder 32 supports continuous writing of target data directly to a database 36 (as well as to other file formats). The database 36 can reside locally on the radar processor computer, as indicated by a phantom connection 38, on another computer on the network, or on both. The database 36 is used preferably for post processing, for interaction with external geographical information systems (GIS) systems, for remote radar displays, for support for web services, and for further research and development (e.g. to investigate and develop target identification algorithms).

Another feature of the radar processor 20 is that it can be controlled remotely over network 34 (schematically shown as a bus in FIG. 1), when a network connection is available. Radar processor control functions are implemented preferably as a web service, or alternatively, by using a virtual network console (VNC) so that the PC keyboard (not shown) and display 28 of radar processor 20 can be run remotely. COTS VNC server software runs on the radar processor PC and client VNC software runs on the remote end of the network 34. If the network 34 includes one or more segments on the Internet, a virtual private network (VPN) is preferably established using COTS technology known to those skilled in the art. In this manner, the radar processor 20 can be remotely controlled from anywhere on an established network, using COTS software and hardware.

If the radar processor 20 is to be controlled remotely over the network 34, it becomes important to also be able to control remotely the marine radar functions as well. These functions include, preferably, power-on/off, transmit/ standby, and operating range selection. Unfortunately, COTS marine radars designed for marine use do not come with network-enabled remote control features. As a result, a feature of the radar sensor of the present invention is a radar controller 40 to control the marine radar through a network-enabled software interface. The radar controller 40 includes hardware (e.g. switches, control codes, etc.) that integrates with the marine radar to replicate control signals provided by the radar manufacturer. This hardware is controllable by software that preferably runs on a COTS PC, and may be the same COTS PC that houses the radar processor. The software provides either a user interface or programmer's interface to control the aforementioned radar features. The software can be accessed over a network (as illustrated in FIG. 1) either as a web service or through a VNC connection as described earlier.

Figure 2:
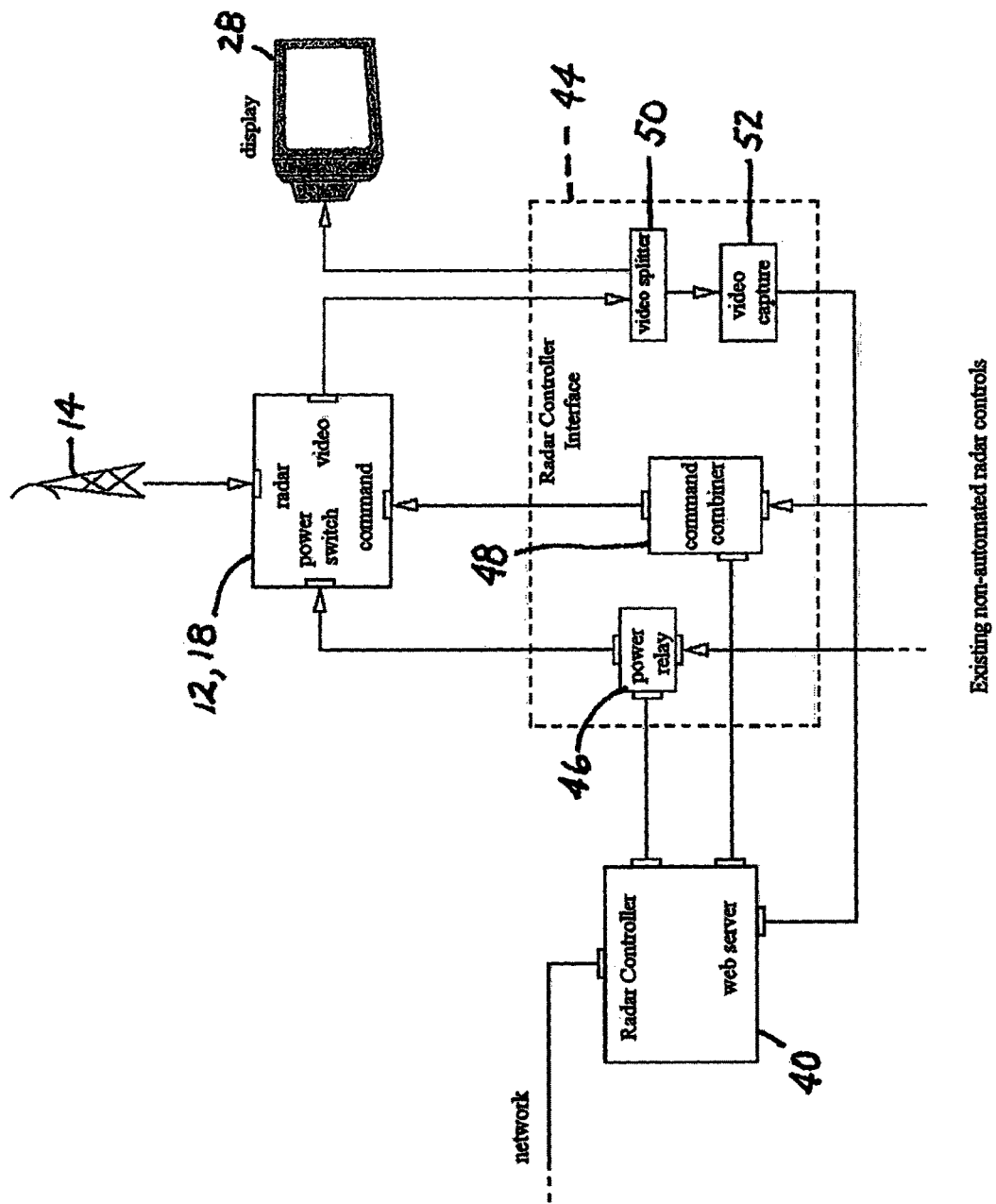
FIG. 2 is a block diagram of a radar controller that may be incorporated into the radar sensor apparatus of FIG. 1, in accordance with present invention.

Marine radars typically remember their state during power down. Therefore, when the radar is powered up, it comes back in its previous state (which includes the range setting). If the marine radar is to be controlled remotely, then it is important that the operator is certain of the state of the radar at all times since the radar processor performance depends on this. A novel feature of the radar controller 40 is its preferred use of the radar's own display 28 to confirm, the radar state. The radar's local display video, schematically represented at 42, is captured preferably using COTS framegrabber technology and made accessible remotely through the radar controller software. In this way, the remote user can use the software to change the radar's state and can confirm immediately that the state has changed as requested by observing the remoted radar display. In FIG. 2, a block diagram of the radar controller 40 is shown. The diagram shows two logical components, namely the radar controller 40 with interface 44, and the marine radar device 12. The radar controller 40 is ideally composed of both COTS hardware and software with the addition of original hardware and software. Controller 40 utilizes a hardware and software interface customized for the particular radar type to be controlled. Where possible, the existing radar control is preserved so that the addition of the computer automation does not interfere with standard manual operation of the radar system. Within the interface 44, the controller is connected to a power switch or relay 46 for enabling remote control of the power supply to radar device 12, and to a command combiner 48 for controlling data transmission functions and antenna range. The interface 44 also includes a video splitter 50 and a video capture module 52 for capturing the radar's local display video 42.

Figure 3:
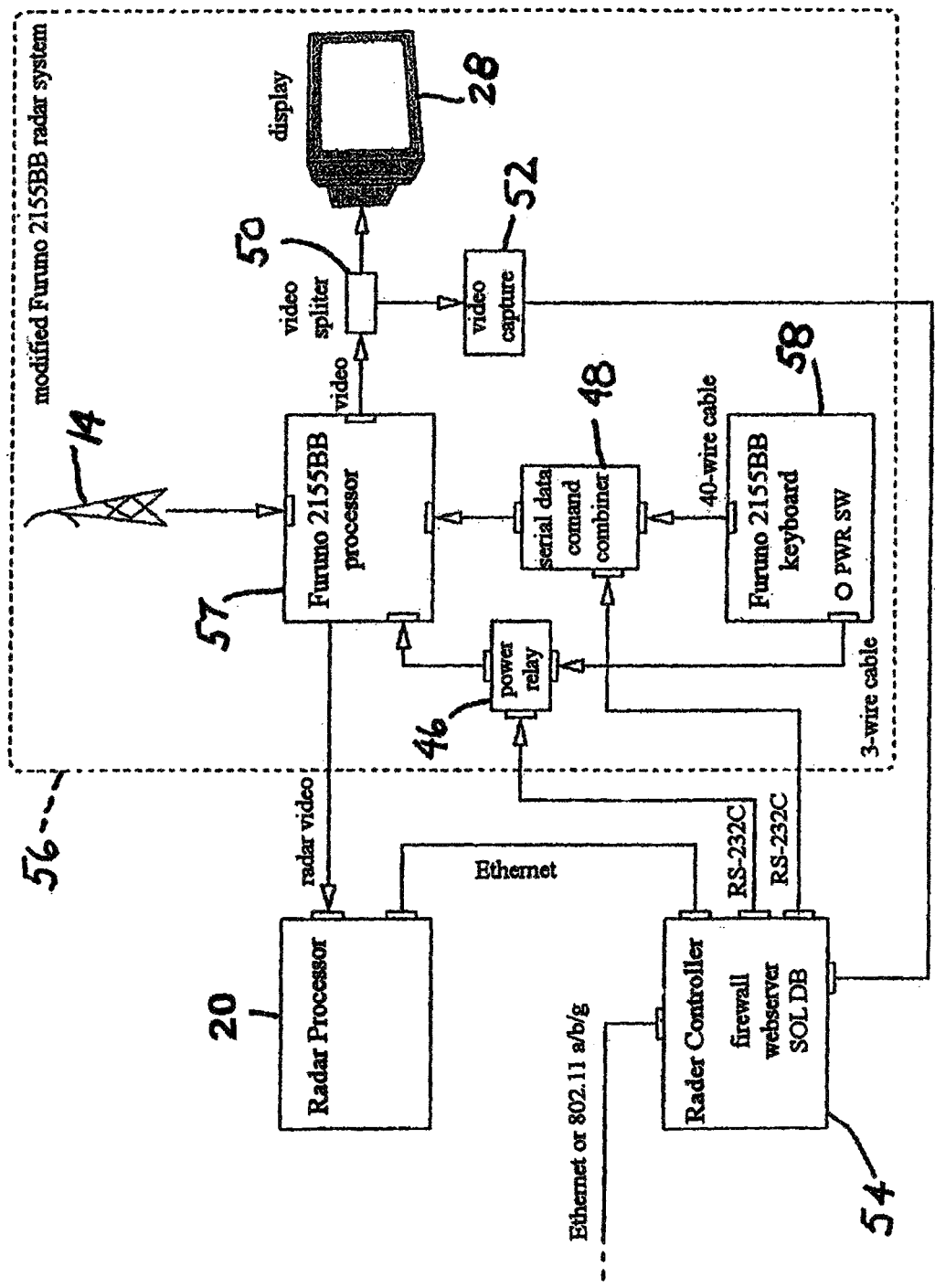
FIG. 3 is a block diagram of a remote controller for a Furuno FR2155BB radar system, in accordance with the present invention.

FIG. 3 shows a preferred implementation 54 of the radar controller 40 of FIG. 2 as applied specifically to a COTS Furuno 2155BB radar system 56. The controller 54 uses serial codes for a variety of functions and relay contact switches for other functions. The emulation of other radar control functions may require the use of digital to analogue (D/A) converters, analog to digital (A/D) converters, digital I/O or other conversion interfaces in order to enable computer control. The combination of hardware interfaces and software application interface are then network-enabled using standard open web services such as XML Remote Procedure Calls (XML-RPC) or SOAP over a standard network transport protocol, such as HTTP.

Components of the COTS Furuno 2155BB radar system 56 in FIG. 3 that perform the same functions as components shown in FIGS. 1 and 2 are labeled with like reference designations. FIG. 3 also depicts a Furuno processor 57, a Furuno keyboard 58 and an ancillary radar processor 20.

One or more radar sensor apparatuses 10 as described above with reference to FIGS. 1-3 can be connected to network 34 to distribute information to remote users. The radar processor architecture supports real-time communication of target data to remote sites using low-bandwidth, COTS network technology (wired or wireless). Since the target data contain all of the important target information (date, time, position, dynamics, plot size, intensity, etc.), remote situational awareness is easily realized. The all-digital architecture facilitates networking of radar target data and control functions to a central monitoring station (CMS) 60 (FIG. 4) to consolidate monitoring resources for an entire radar network, thereby minimizing operating cost and providing for low-cost, high-performance radar networks. The use of open network protocols such as TCP/IP and HTTP allow the delivery of the radar data anywhere over the Internet. It also makes available a number of standard web service protocols that can be used on the network to provide a software application programming interface (API). One example of this is the use of XML-RPC in the radar controller 40, 54 to create a network-enabled API that is accessible over HTTP. A web server is then used to provide a client interface to a remote user.

The web server functions as both a web client application to the XML-RPC server to perform the radar control functions, as well as a web server application to provide a user-friendly graphical interface to a remote user with a client web browser. This same principle is applied to other radar data services, such as the web services server interface to a TCP/IP networked SQL database containing a repository of past and live real-time radar data.

Figure 4:
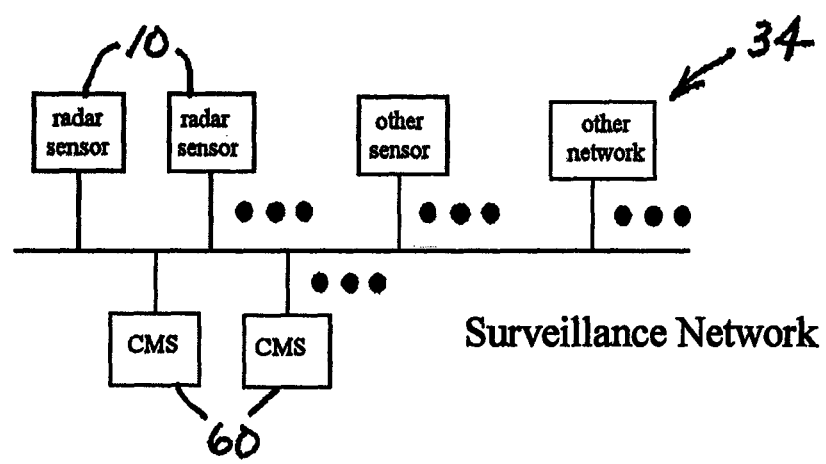
FIG. 4 is a block diagram showing a radar network incorporating plural instances of the radar sensor apparatus of FIGS. 1, 2, and/or 3, in accordance with the present invention.

FIG. 4 shows a conceptual diagram of the computer radar network 34. One or more radar sensors 10 send their target data to one or more CMS 60 (which could be co-located with any of the radar sensors 10). The target data consists of detection data, track data and/or alerts. Raw radar video data could also be sent to the CMS 60 in real-time if a suitable network was available, but preferably, target data is sent. Other types of surveillance sensors (e.g. sonar) can also be on the network 34. The network 34 and its software are typically COTS. The CMS 60 has a fusion/display processor 62 (FIG. 5) that processes, combines, displays and archives the data. Integrated tactical information, including displays and alerts, is provided. Track and detection data from the separated radar sensors 10 may be fused to take advantage of their spatial diversity and improve the radar network performance beyond that of the radar sensors themselves using multi-sensor data fusion methods known to those skilled in the art. This takes advantage of the spatial diversity of the sensors, and improves the radar network performance beyond that of the radar sensors 10 themselves. Data can also be accessed and integrated from other private or public networks (e.g. military, NEXRAD) as well.

Figure 5:
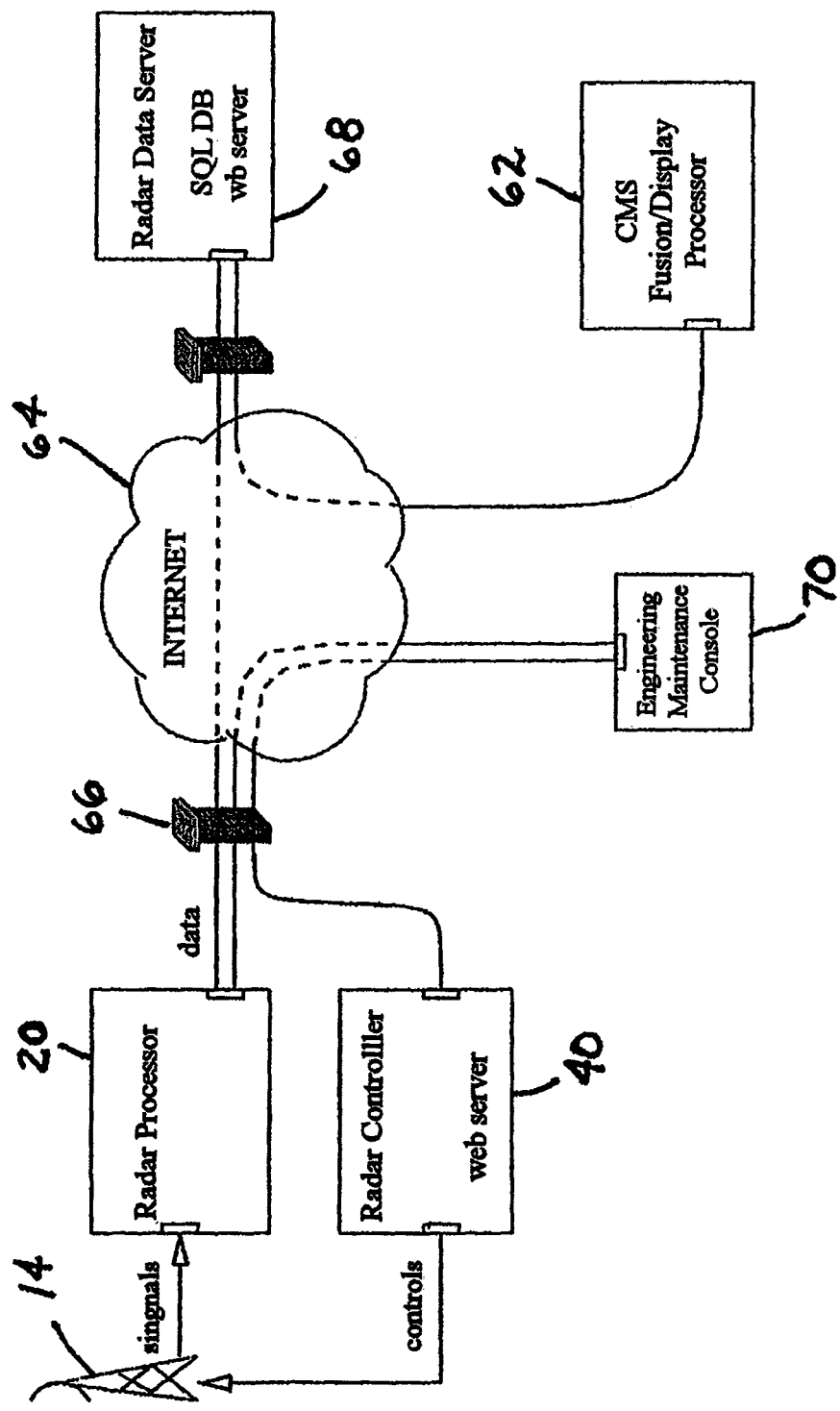
FIG. 5 is a block diagram of radar network architecture in accordance with the present invention.

FIG. 5 shows a preferred embodiment where the radar network 34 is implemented via the global computer network 64 known as the "Internet", with only a single radar apparatus 10 shown. The same configuration of radar processor 20 plus radar controller 40 (or 54) is replicated for other sites. Each site is connected to the Internet network 64 using a firewall and router device 66. (It is not necessary to use the Internet 64 as part of the network; a completely dedicated or private network could obviously be used as well.) This configuration enables each independent site to connect and send radar data continuously and in a real-time fashion to a remote radar data server 68 and to enter it into a common SQL database server. A single SQL database server is capable of receiving radar data from multiple related Radar Processor sites simultaneously. The centralized pooling of radar data from the multiple radar sites allows for integration or fusion of related radar data by the CMS Fusion/Display processor 62. An example of this is the processing of radar target tracks that cross the radar coverage area scanned by the radar antenna 14 of physically adjacent or related radar sensors 10.

The use of a standard open high-performance networked SQL database server in the radar data server 68 further maximizes the flexibility in providing the data services to multiple CMS users on the network 34 while keeping costs low. The asynchronous messaging within the SQL database allows the radar processor 20 to indicate when a new scan of data is available inside the database. This signals the fusion/display processor 62 of any CMS 60 to monitor a particular radar processor 20 to update its display in real-time with the latest data. The CMS fusion/display processor 62 need not be local to the radar data server 68 and may be located anywhere on the network 34, whether realized via the Internet 64 or a private network (not separately illustrated). In addition to monitoring live radar data, the CMS 60 also provides the capability to play back past recorded radar data. The functionality is analogous to that of a COTS hard-disk based Personal Video Recorders (PVR) such as TiVO. The CMS 60 may similarly allow a user to:
- choose to watch a particular live radar data feed coming from a single or multiple radar processors 20, with Picture-In-Picture type monitoring,
- pause the display,
- continue the display (now delayed from live by the pause time),
- rewind or fast-forward through the data with display at 2×, 4×, or 8× rates,
- play back at ⅛×, ¼×, ½×, 1× (real-time), 2×, 4×, or 8× speed,
- play back data from a particular time stamp or index marker,
- choose another pre-recorded experiment from menu, and resume monitoring of the live data feed.

A handheld remote control device similar to that of a PVR, VCR, or DVD player preferably provides the operator with a familiar human device interface. Such high-performance features added to a radar network as described above are unique to the present invention, all at affordable cost by exploiting open and COTS technologies.

The network-enabled XML-RPC API of the radar controller 40 (or 54) gives programmatic access to the radar by an engineering maintenance console 70 (FIG. 5). Operations across multiple sites may be scheduled ahead of time and executed remotely by software. An example of this is the scheduling of monitoring only during a nightly interval. Another example is the automated change of radar parameters during daytime monitoring.

In a similar manner to the use of sophisticated radar processing and tracking, the CMS fusion/display processor 62 shown in FIG. 5 can fuse target data from a radar network 34 to enhance the performance of these noncoherent low-cost radar systems, and have them approach the level of more expensive coherent radar systems. Some of the performance improvements achievable through integration and fusion of data from radar networks include but are not limited to the following:
- Multi-radar fusion to improve track accuracy, continuity, quality, etc.
- Spatial diversity against target fluctuations in RCS (necessary for small targets)
- Spatial diversity for shadowing due to geographic obstructions
- Spatial diversity to cover extended borders, equivalently increasing radar coverage The richness of the target data available from each radar sensor apparatus 10 in the network allows much flexibility when such data is required to be combined or fused for a wide-area display. Depending on the level of fusion required (which will be driven by application, geography and target density), the target data permits both contact (detection) and track-level combination of data. The following (non-exhaustive) list provides some examples of possible fusion methods that may be applied to the available data:
- Synchronous fusion (contact-level)
- Parallel fusion (contact-level)
- Best track (track-level)
- Covariance intersection (track-level)
- Information fusion (track-level)
- Reasoning and knowledge-based approaches As is known to those skilled in the art, numerous methodologies and algorithms exist for combining such data, and new techniques are always being developed. The following references provide examples of such methods [D. L. Hall, J. Llinas (Eds), Handbook of Multisensor Data Fusion, CRC Press, 2001], [Y. Bar-Shalom (Ed.), Multitarget-Multisensor Tracking: Advanced Applications, Vol. I, Artech House/YBS Publishing, 1998.] and [D. L. Hall, Mathematical Techniques in Multisensor Data Fusion, Artech House, Norwood MA, 1992]. The sophistication of the aforementioned radar detection and track processing, as well as the careful archiving and transmission of this data, ensures that the CMS fusion/display processor 62 can incorporate and evaluate any applicable fusion strategy, including new and emerging methods. Another significant feature of the present radar surveillance system is the ability to customize the level and extent of the integration and fusion available, which is achievable through the rich-information that has been produced and recorded by the radar detection processor 22 and tracker processor 24.

Figure 6:
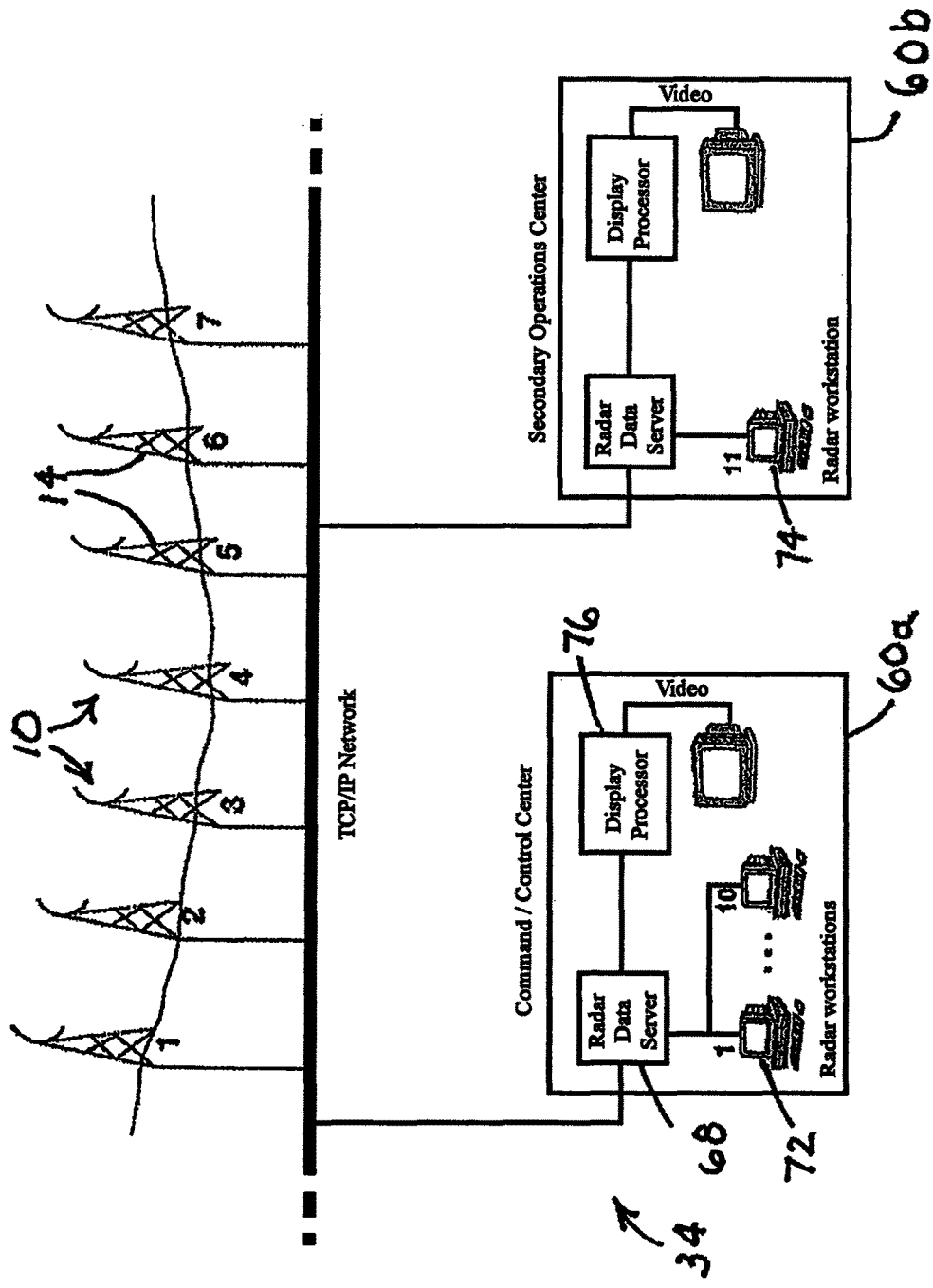
FIG. 6 is essentially a block diagram showing a central monitoring site or operations center using the radar network of the present invention.

FIG. 6 illustrates an example of a radar network 34 in accordance with principles elucidated herein. Seven radar sensors 10 schematically depicted as antennas 14 are assumed to be geographically separated to cover a wide-area of surveillance. Land-based installations are assumed, and antenna towers are made high enough to reduce blockage to acceptable levels, but low enough to be cost-effective and covert. Portable and mobile systems are also possible. In this example, two CMS's 60 are shown, one indicated as a command and control CMS 60*a* and the other as a secondary operations center 60*b*. Ten radar workstations 72 are shown in the one CMS 60*a* and a single radar workstation 74 in the other 60*a*. Each radar workstation 72, 74 can run the CMS fusion/display processor to create an integrated tactical surveillance picture from target data associated with a particular radar sensor 10, or multiple radar sensors. These support multiple operators with specific missions. A dedicated display processor 76 that provides a completely integrated tactical picture preferably using all of the available radar sensors 10 drives a large war-room type display. Each radar workstation 72, 74 is a dedicated workstation or workstations 72, 74 could also serve as the engineering maintenance console 70.

Another novel feature of the present radar surveillance system is the provision of a remote integrated tactical display to a mobile user. For example, consider the case where law enforcement personnel are attempting to thwart an illegal activity in a border patrol application. The law enforcement personnel are located on mobile vessels on the water border. Using their on-board marine radar provides little or no situational awareness for reasons described earlier.

Furthermore, line of sight is extremely limited because of the low height of the marine radar above the water. Instead, the law enforcement vessel receives an integrated tactical picture from the CMS 60 over a wireless network 34. The law enforcement vessel has an on-board COTS PC running a remote CMS Display Client that provides the integrated tactical picture created by the CMS Fusion/Display Processor. Preferably, the vessel's current location is shown on the tactical picture via a GPS input. The CMS 60 (or 60*a*, 60*b*) simply routes fused target data produced by the CMS fusion/display processor 62 over a wireless network 34 to the CMS Display Client. The law enforcement vessel gains the benefit of the performance of the entire radar network. Even if only a single radar sensor 10 is available and the radar processor 20 remotes its target data to the CMS display client directly, the vessel will have the radar visibility of a land-based, tower-mounted marine radar and sophisticated processing that far exceed the capabilities of the on-board marine radar.

Sighting land-based radar sensors to maximize coverage is an important factor in network design and resulting radar network system performance. Sighting a radar for coverage can be a labor intensive and hence expensive process. In accordance with another feature of the radar processor of the present invention, this labor cost is minimized. The display processor 26 includes the ability to overlay PPI radar video (with now ground clutter suppression) on top of a geo-referenced map. Since the radar sensors 10 are land-based, this overlay will immediately show the presence of ground clutter, or its absence due to blockage or shadowing. Wherever ground clutter is present and overlaid on the map, coverage is available, where ever it is not, coverage is not available (at least for targets low to the ground). Moving the radar around in a mobile vehicle (e.g. a truck with a telescopic mast) and creating these coverage maps in real-time is a convenient, efficient, and cost-effective way of sighting the radar sensors that will form a radar network.

One of the key features of the present radar surveillance system is the exploitation of COTS technologies to keep the radar sensors and radar network low-cost. Not only is initial purchase cost made affordable with this approach, but maintenance and replacement are also characterized by short lead times, multiple suppliers, and reasonable prices. The systems in accordance with the present invention deliver high performance with features tailored to customer needs while minimizing the three major components of cost: purchase cost, maintenance cost and operational cost.

A final feature of the present radar surveillance system is its software re-configurability which permits extensive customization to adapt its features to specific applications other than those described herein, with reasonable levels of effort. This will permit access to smaller markets since minimum economic quantities of customized systems will be small. The software platform architecture also permits upgrades, feature addition, and target market customization.

Particular features of our invention have been described herein. However, simple variations and extensions known to those skilled in the art are certainly within the scope and spirit of the present invention.

We claim:

1. A radar data distribution system for providing radar data services to remote homeland security and law enforcement operators, comprising:
   at least one radar apparatus configured to transmit radar pulses, receive radar echoes, and generate, from the received radar echoes, radar target data;
   one or more remote computers;
   a radar data server operatively connected to said at least one radar apparatus and including a SQL database, said radar data server being structured to continuously receive radar target data from said at least one radar apparatus in real-time, configured to organize, insert, and store said radar target data in said SQL database, and adapted to immediately distribute the organized, inserted and stored radar target data to said one or more remote computers over a data network, said radar data server including said SQL database being further configured to enable subsequent access by said one or more remote computers to said organized, inserted and stored radar target data, each of said remote computers being configured to receive respective radar target data from said radar data server over said data network and provide a respective tactical display, said data network being operatively connected to said radar data server and each of said remote computers;
   said radar data server being further configured with a web server and said one or more remote computers each being configured with a web browser adapted to render said respective tactical display and show said respective radar target data.

2. The system of claim 1 wherein said data network is a public network with wired and/or wireless links between said radar data server and said remote computers.

3. The system of claim 1 wherein at least one of said remote computers is configured for mobility and accordingly use by at least one of said remote homeland security and law enforcement operators at each of a sequence of spaced locations.

4. The system of claim 3 wherein said at least one of said remote homeland security and law enforcement operators and said at least one of said remote computers are on a vessel.

5. The system of claim 4 wherein said vessel's location obtained from a GPS input to said remote computer is also indicated on said respective tactical display.

6. The system of claim 1 wherein said radar data server receives target data from at least one mobile radar system.

7. The system of claim 1 wherein said radar data server receives target data from at least one portable radar system.

8. The system of claim 1 wherein at least one of said remote computers is located at a central monitoring site and said respective tactical display integrates and fuses target data from all available radar sensors for viewing on a single display.

9. The system of claim 1 wherein said organized, inserted and stored radar target data in said radar data server is further configured to be available for radar target data playback by said remote computer.

10. The system of claim 9 wherein said remote computer is further configured to provide a playback capability, said playback capability configured to provide an operator with the means to play back radar target data from a particular time stamp or index marker.

11. The system of claim 1 wherein said radar target data includes radar track data and wherein:
said radar data server is configured to transmit alert data with radar target data to at least one of said one or more remote computers; and
said at least one of said one or more remote computers is configured to include said alert data in the respective tactical display.

12. The system of claim 11 wherein said alert data incorporates information selected from the group consisting of collision prediction, vessel origin, vessel destination, perimeter approach, perimeter violation, and traffic density.

13. A radar data distribution method for sharing radar data with remote users comprising:
operating at least one radar apparatus to transmit radar pulses;
further operating said at least one radar apparatus to receive radar echoes;
additionally operating said at least one radar apparatus to generate, from the received radar echoes, radar target data;
operating a radar data server to receive said radar target data from said at least one radar apparatus in real-time, to organize, insert, and store said radar target data in a SQL database and to immediately distribute select subsets of the organized, inserted and stored radar target data in said SQL database to one or more remote first computers over a data network; and
additionally operating said radar data server to subsequently access said organized, inserted and stored radar target data in said SQL database and to select portions of said organized, inserted and stored radar target data and distribute said portions to one or more remote second computers over the data network.

14. The method of claim 13, further comprising operating each of said one or more remote first computers to receive a respective one of said subsets of the radar target data in real time from said radar data server over said data network and to provide a real-time respective tactical display from the respective one of said subsets of the radar target data, thereby providing situational awareness to respective operators of said one or more remote first computers.

15. The method of claim 14 wherein said radar data server is configured with a web server and said one or more remote first computers are each configured with a respective web browser, further comprising operating said one or more remote first computers via the web browsers thereon to provide a client-server interface between respective operators and said radar data server and to render said respective tactical display in said respective web browser.

16. The method of claim 14 wherein at least one of said remote first computers is configured for mobility and accordingly use by one of said remote users at each of a sequence of spaced locations.

17. The method of claim 16 wherein said at least one of said remote users and said at least one of said remote first computers are on a vessel.

18. The method of claim 17 wherein said vessel's location obtained from a GPS input to said at least one of said remote first computers is also indicated on the respective tactical display.

19. The method of claim 14 wherein at least one of said remote first computers is located at a central monitoring site and the respective tactical display integrates and fuses radar target data from all available radar sensors for viewing on a single display.

20. The method of claim 14 wherein said organized, inserted and stored radar target data includes track data, further comprising:
operating said radar data server to transmit alert data with a respective one of said subsets to at least one of said one or more remote first computers; and
operating at least one of said one or more remote first computers to include said alert data in the respective real-time respective tactical display.

21. The method of claim 20 wherein said alert data incorporates information selected from the group consisting of collision prediction, vessel origin, vessel destination, perimeter approach, perimeter violation, and traffic density.

22. The method of claim 13 wherein said data network is a public network with wired and/or wireless links between said radar data server and said remote computers.

23. The method of claim 13 wherein said radar data server receives radar target data from at least one mobile radar system.

24. The method of claim 13 wherein said radar data server receives radar target data from at least one portable radar system.

25. The method of claim 13 wherein said organized, inserted and stored radar target data in said radar data server is further configured to be available for target data playback by said remote computers.

26. The method of claim 25 wherein said remote first computers are further configured to provide a playback capability, said playback capability configured to play back radar target data from a particular time stamp or index marker in the past.

27. The method of claim 13, further comprising configuring, by the radar data server, each of the select subsets of target data for presentation on a tactical display of a web browser.

* * * * *